United States Patent [19]
Goldberg

[11] Patent Number: 5,014,344
[45] Date of Patent: May 7, 1991

[54] METHOD FOR SYNCHRONIZING THE TRANSMISSIONS IN A SIMULCAST TRANSMISSION SYSTEM

[75] Inventor: Steven J. Goldberg, Coral Springs, Fla.

[73] Assignee: Motorola, Inc., Schaumburg, Ill.

[21] Appl. No.: 495,819

[22] Filed: Mar. 19, 1990

[51] Int. Cl.⁵ .............................................. H04B 1/00
[52] U.S. Cl. ....................................... 455/51; 455/56; 340/825.44; 375/107
[58] Field of Search ...................... 455/18, 51, 56, 33; 340/825.44, 825.5; 375/107; 370/103, 108

[56] References Cited

U.S. PATENT DOCUMENTS

| | | | |
|---|---|---|---|
| 4,517,669 | 5/1985 | Freeburg et al. | 455/51 |
| 4,696,051 | 9/1987 | Breeden . | |
| 4,696,052 | 9/1987 | Breeden . | |
| 4,709,401 | 11/1987 | Akerberg | 340/825.44 |
| 4,718,109 | 1/1988 | Breeden et al. . | |
| 4,721,955 | 1/1988 | Dunkerton et al. . | |
| 4,850,032 | 7/1989 | Freeburg | 455/56 |

FOREIGN PATENT DOCUMENTS 0197556 10/1986 European Pat. Off. .
0198448 10/1986 European Pat. Off. .

*Primary Examiner*—Curtis Kuntz
*Attorney, Agent, or Firm*—Philip P. Macnak; Vincent B. Ingrassia; William E. Koch

[57] ABSTRACT

A method for synchronizing message transmissions in a simulcast transmitter system is described. A master controller couples to a plurality of regional controllers for enabling message transmissions and for initiating delay measurement signal transmissions in each of a plurality of regions. The master controller generates a first delay measurement signal which is transmitted from a selected one of a plurality of regional transmitters operating within a first transmission region. The regional controller within the first transmission region measures the propagation delay of the selected one of the plurality of regional transmitters within the first transmission region. The master controller next generates a second delay measurement signal which is transmitted from a selected one of the plurality of regional transmitters operating within a second transmission region adjacent to the first transmission region. The regional controller within the first transmission region measures the propagation delay of the selected one of the plurality of regional transmitters within the second transmission region. The intra-regional differential propagation delay is computed from the measurements of the propagation delays measured from the first and second transmission regions. The additional transmission delay is computed for each of the regional transmitters within the first and second transmission regions, and the transmission delays for each regional transmitter are adjusted to equalize the intra-regional differential transmission delays between the first and second transmission regions.

8 Claims, 11 Drawing Sheets

— CONTROL SIGNAL
— 1ST DELAY MEASUREMENT SIGNAL
------ 2ND DELAY MEASUREMENT SIGNAL

— CONTROL SIGNAL
— 1ST DELAY MEASUREMENT SIGNAL
------ 2ND DELAY MEASUREMENT SIGNAL

METHOD FOR SYNCHRONIZING THE TRANSMISSIONS IN A SIMULCAST TRANSMISSION SYSTEM

BACKGROUND OF THE INVENTION

1. Field of the Invention

The disclosed invention generally relates to the field of simulcast transmission systems, and more particularly a method and apparatus for automatically synchronizing the transmissions in a wide area simulcast transmission system.

2. Description of the Prior Art

A number of methods have been proposed or are in use today for automatically synchronizing the message transmissions of transmitters utilized in simulcast transmission systems. One such system is described in U.S. Pat. No. 4,718,109 to Breeden et al., entitled "Automatic Synchronization System" which is assigned to the Assignee of the present invention. A simulcast transmitter system is described wherein a master transmitter was centrally located within a plurality of secondary transmitters disposed in an annular fashion around the central transmitter. The innermost annular ring of transmitters were synchronized to the master transmitter, while the remainder of the system transmitters were disabled. The next adjacent annular band of transmitters were then synchronized to the innermost annular band and the process was repeated until every annular band in the system was synchronized. Such a synchronizing arrangement guaranteed adjacent annular bands were properly synchronized, however such a system did not necessarily provide for variations in delay which were introduced do to not utilizing a common signal source for making the delay measurements.

An alternate method of synchronizing the transmitters in a simulcast transmission system having a large number of transmitters is shown in FIG. 1. An important factor in determining the regularity to which the transmissions in such a simulcast transmission system was synchronized was the time required to complete the transmitter propagation delay measurement sequence. For a large simulcast transmission system, such as one having forty transmitters, delay measurement times of forty seconds and more were typical when each region was sequentially accessed for measuring the individual transmitter propagation delays. FIG. 1 shows a typical large multi-transmitter simulcast system 100 which has been divided into a plurality of smaller transmission regions 102, each transmission region 102 having a plurality of regional transmitters 104 responsive to a regional controller 106 for controlling the transmission of messages and further for controlling the transmission of information utilized for synchronization of the transmitter transmissions. Each transmission region 102 included one or more regional receivers 108 (only one of which is shown), which was coupled to the corresponding regional controller to provide monitoring of delay measurement signals required to enable the measurement of the inter-regional propagation delays for each of the regional transmitters in each transmission region 102. By splitting the simulcast transmitter system 100 into the smaller transmission regions 102, the inter-regional propagation delay measurements could be simultaneously measured for regional transmitters in alternate transmission regions, such as shown for regional transmitters 104 and 104" within transmission regions 102 and 102", respectively, thereby reducing the total time required to synchronize transmissions within the system. Measurement of the transmitter propagation delays as shown in FIG. 1, while speeding up the inter-regional propagation delay measurement process, presented a new set of problems, such as that of measuring the intra-regional propagation delays required to synchronize the transmitters in adjacent transmission regions.

In order to measure these intra-regional propagation delays, an output 110 of one of the regional controllers 106 was redirected to a regional transmitter 104 in an adjacent transmission region, as shown in FIG. 1, in order to establish a signal source for the intra-regional measurements. Once the intra-regional transmission propagation delays were measured, the intra-regional differential propagation delays were computed and then added to the inter-regional differential propagation delays for each transmission region to determine the total transmission delay required for each transmitter to synchronize the transmissions of the transmitters within each transmission region and between transmission regions.

A number of problems arose from the method of FIG. 1 for synchronizing the transmissions of such a simulcast transmitter transmission system. The intra-regional transmission propagation delays required a means for switching between two transmission sources for the same transmitter, i.e. controller 106 and controller 106'. This switching of sources added errors to the measurements consisting of delays introduced by the added signal path utilized to make the intra-regional measurements, which could easily approach hundreds of microseconds of added delay. When multiply adjacent transmissions regions occurred, i.e. where more than two transmission regions overlaped, additional switching hardware was required to interconnect each of the regions for measurement, further contributing to errors in the propagation delay measurements, and adding substantially to the cost of the system. The method of FIG. 1 also restricted cross check measurements between the adjacent regions without the utilization of additional hardware to provide such cross check measurements. The method of FIG. 1, also became inoperative in those instances when the transmitter used to compare intra-regional measurements became inoperative. To resolve this problem required additional hardware in the form of redundant switching to other transmitters within the transmission regions to be available when the primary transmitter failed. The method of FIG. 1 also precluded restructuring of the transmitters in the system as the system operator deemed appropriate, such as when a better combination of transmitters was determined to provide for more accurate propagation delay measurements within the simulcast transmitter system.

SUMMARY OF THE INVENTION

It is an object of the present invention to provide a method for synchronizing the transmissions of a simulcast transmitter transmission system.

It is a further object of the present invention to provide a method for synchronizing the transmissions of the simulcast transmitter transmission system which provides improved measurement capability.

It is a further object of the present invention to provide a method for synchronizing the transmissions of the simulcast transmitter transmission system which provides measurement reconfigurability.

It is a further object of the present invention to provide a method for synchronizing the transmissions of the simulcast transmitter transmission system which provides simple cross-check measurement capability.

These and other objects of the present invention are achieved by providing a method for synchronizing message transmissions in a simulcast transmitter system. The system comprises at least two transmission regions, each transmission region having at least one regional receiver coupled to a regional controller for receiving delay measurement signals generated for the measurement of transmission propagation delays. Each transmission region includes a plurality of regional transmitters having adjustable transmission delays which are responsive to the regional controllers for transmitting the messages and the delay measurement signals. A master controller couples to each regional controller for enabling the message transmissions and for initiating the transmission of delay measurement signals for the measurement of propagation delays. The master controller generates a first delay measurement signal for the first region, and effects the transmission of the first delay measurement signal from a selected one of the plurality of regional transmitters operating within the first transmission region. The regional controller within the first region measures the propagation delay from the selected transmitter within the first transmission region. The master controller next generates a second delay measurement signal and effects the transmission of the second delay measurement signal from a selected one of the plurality of regional transmitters operating within a second transmission region adjacent to the first transmission region. The regional controller within the first region measures the propagation delay from the selected transmitter within the second transmission region. The intra-regional differential propagation delay between the transmission of the first and second delay measurement signals is computed. The transmission delays for each regional transmitter operating within the first and second transmission regions are computed based on the computed intra-regional differential propagation delay, and the transmission delays for each transmitter within the first and second transmission regions are adjusted to equalize the intra-regional differential transmission delays between each transmission region.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENT

Figure 1:
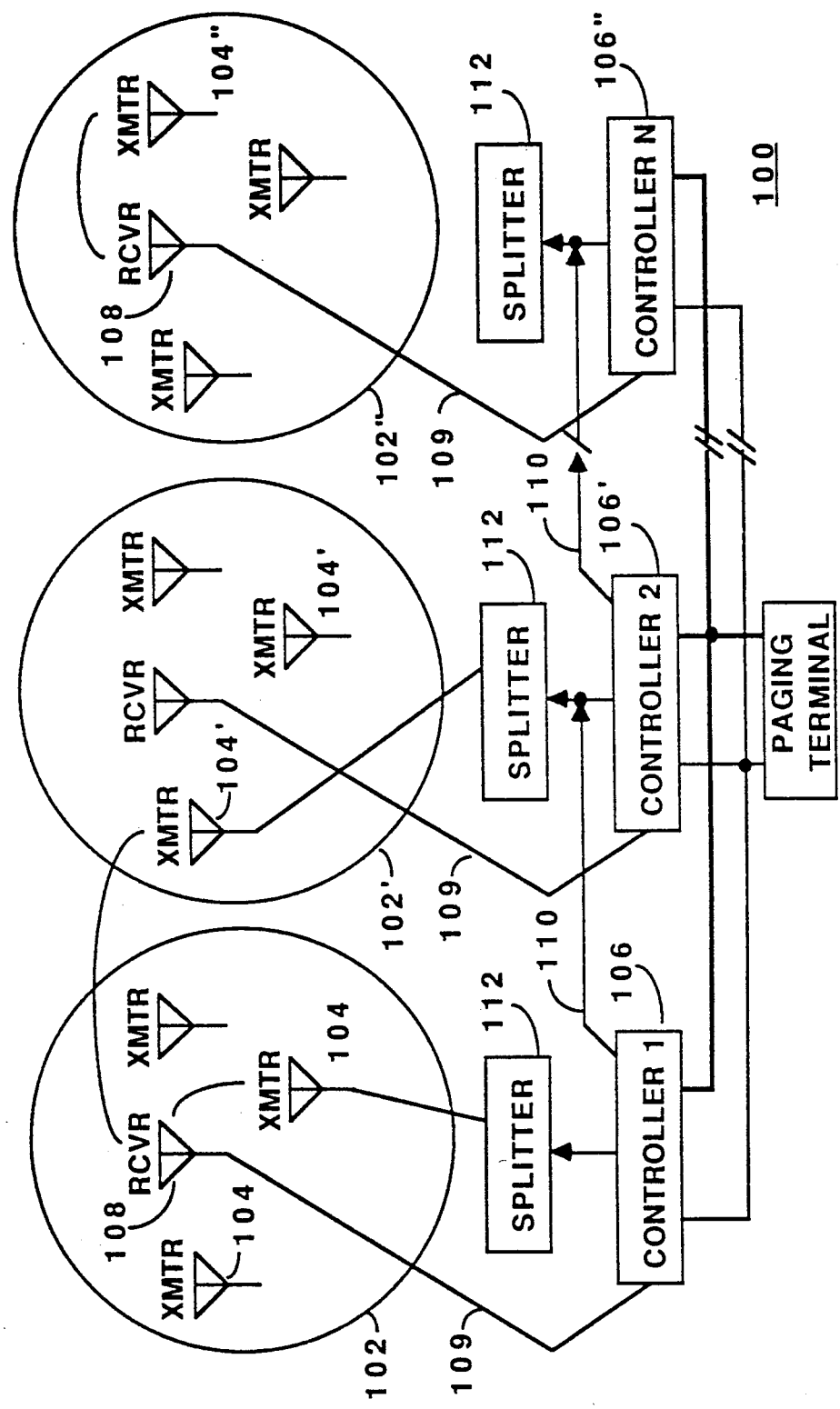
FIG. 1 is an electrical block diagram showing the implementation of the inter-regional and intra-regional delay measurements in a prior art simulcast transmission system.
Figure 2:
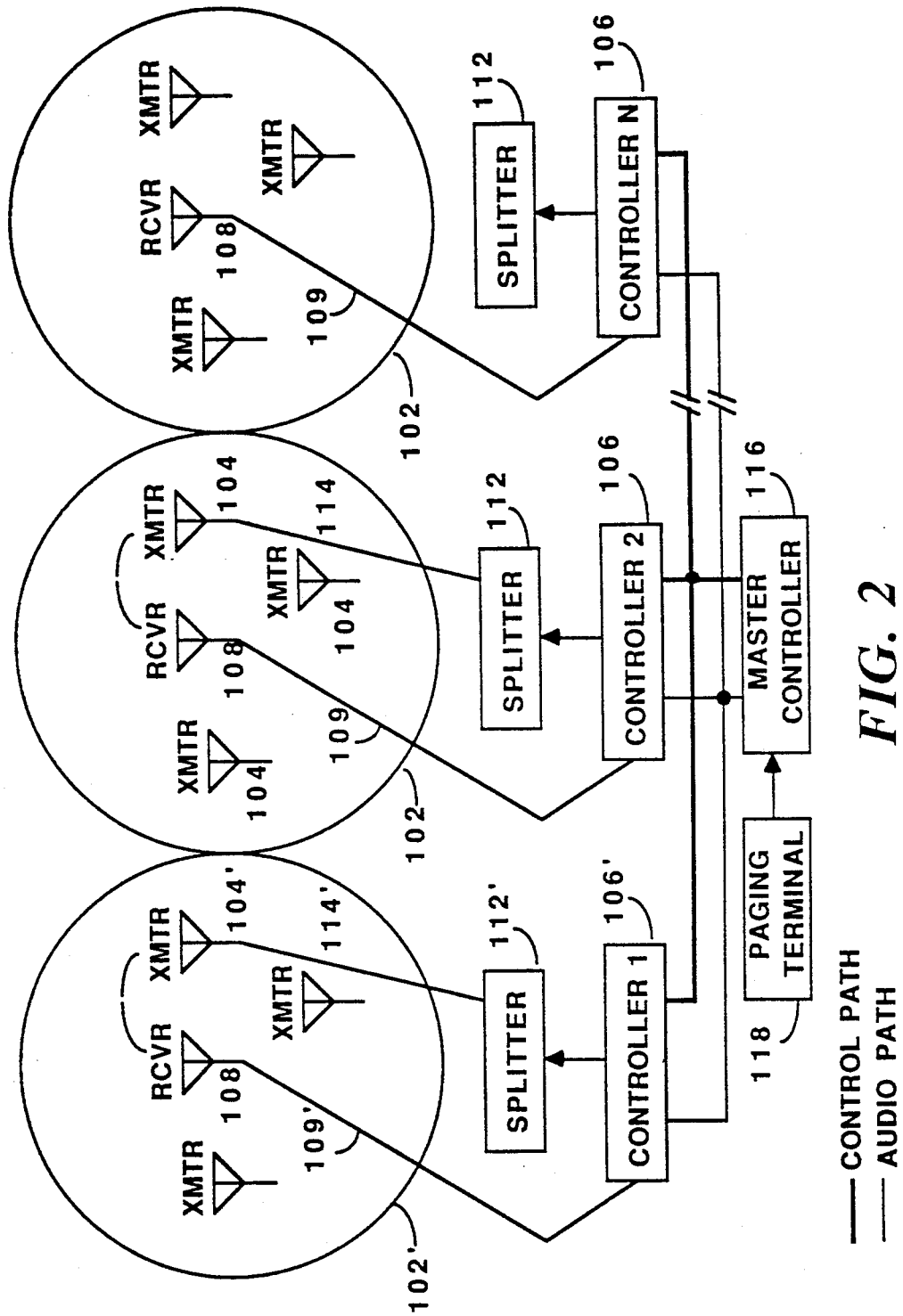
FIG. 2 is an electrical block diagram showing the implementation of the inter-regional and intra-regional delay measurements in a prior art simulcast transmission system of the present invention.

FIGS. 2-9 show the preferred embodiment of the present invention, a simulcast transmission system providing improved propagation delay measurement capability which is required for the synchronization of message transmissions from a plurality of transmitters operating in a plurality of transmission regions. As shown in FIG. 2, the simulcast transmitter system of the present invention comprises at least two transmission regions 102. FIG. 2 in particular shows three regions, although it will be appreciated from the description to follow, any number of regions may be accommodated by the system. Each transmission region includes at least one regional receiver 108 for receiving transmitted delay measurement signals. The regional receivers, such as conventional FM (frequency modulated) receivers, are well known in the art. Each regional receiver 108 is coupled to a regional controller 106 through any of a number of well known communication links 109, such as wireline links, RF links employing link transmitters and receivers, and microwave links. It will be appreciated, the number of regional receivers required within each transmission region is a function of such parameters as the size and topography of the transmission region. Transmission regions covering large cities, as for example the New York Metropolitan area, would generally require multiple regional receivers due to the enhanced propagation delays encountered between the transmitters and receivers within such large cities. When multiple receivers are required in the simulcast transmission system, it will be appreciated a signal strength voting means (not illustrated), which is well known in the art, is utilized to select the regional receiver which provided the greatest signal output for propagation delay measurements from each transmitter within the transmission region. It will also be appreciated, cross delay measurements, i.e. the comparison of the propagation delay measurement between each of the regional receivers, is required to account for differences in the signal paths between each of the plurality of receivers and the regional controller.

Each transmission region includes a plurality of regional transmitters 104 which are responsive to the regional controllers 106 for transmitting the messages, and for transmitting the delay measurement signals, as shown in FIG. 5, and which will be described in detail below. Returning to FIG. 2, each regional controller 106 may couple to a splitter 112, or point-to-multipoint transmission device when more than one transmitter is provided within a region. Splitters, providing such point to multipoint transmission are well known in the art. The regional controller is to be described in detail with FIG. 3 below.

The simulcast transmission system of the present invention also includes a master controller 116, unlike that of the prior art systems, which couples to each regional controller, for enabling the distribution of the message transmissions, and for initiating the transmissions of the delay measurement signals which are utilized for the measurement of the inter-regional and intra-regional propagation delays, as will be explained below. A paging terminal 118 couples to the master controller 116 to provide the messages which are inputted into the system by the message originators over the public switched telephone network (PSTN), which is not shown. The operation of paging terminals such as shown in FIG. 2 are well known in the art.

Figure 3A:
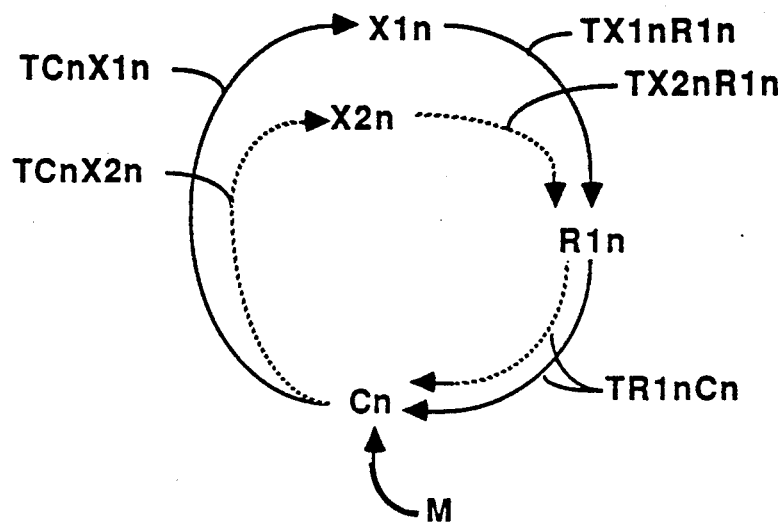
FIGS. 3A and 3B are signal flow diagrams illustrating the inter-regional delay measurement procedure and the intra-regional delay measurement procedure, respectively, for the simulcast transmission system of the present invention.
Figure 3B:
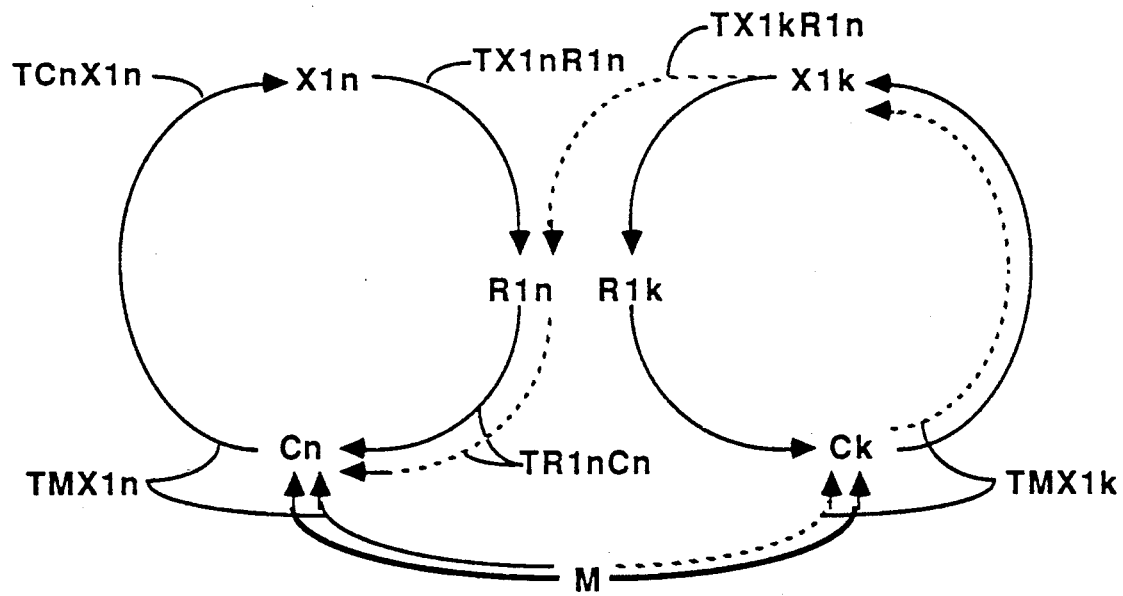

The method of measuring the propagation delays within the simulcast transmitter system of the present invention is further best understood by way of the signal flow diagrams of FIGS. 3A and 3B. The values of ultimate interest are the differences in the transmission, or propagation delays between transmitters. The differential propagation delays are calculated from the measured propagation delays in two stages, the inter-regional differential propagation delay measurements and calculations which are illustrated with FIG. 3A, and the intra-regional differential propagation delay measurements and calculations, which are illustrated with FIG. 3B. The inter-regional and intra-regional propagation delay measurements are initiated at predetermined times, such as once each day, although it will be appreciated other measurement intervals, such as twice each day or every other day, can be utilized as well depending upon the stability of the transmission delays of the overall simulcast transmission system. The following nomenclature is used to identify the system elements to allow computation of the differential propagation delays from the corresponding propagation delay measurements:

Cn, Ck—regional controller in nth and kth region
Xmn, Xmk—transmitter m in nth and kth region
Rjn, Rjk—Receiver j in nth and kth region
M—Master Controller The propagation delays within the system are identified using the following notation:

T(source)(destination)

where T is the propagation delay time for a signal, in this instance the delay measurement signal, to propagate from the signal source to the signal destination. As an example, the notation TCnX1n identifies the transmission time, or propagation delay, encountered between the regional controller in transmission region n and transmitter 1 in transmission region n.

FIG. 3A is a signal flow diagram for the inter-regional propagation delay measurements. Each measurement is initiated by the master controller which generates a measurement control signal which is suitably encoded to select the regional controller for the region in which the measurements are to be made, and which identifies the measurement initiated as an inter-regional propagation delay measurement. The regional controller so selected then sequences through each of the transmitters in a predetermined order to make the individual propagation delay measurements for each transmitter within the transmission region.

The inter-regional transmission delay for each of the regional transmitters is determined by measuring the loop back delay. The loop back delay is defined as $$TmCnCn = TCnXmn + TXmnRjn + TRjnCn$$

where $TmCnCn$ is the loop back delay which is being measured for transmitter m within transmission region n. The loop back delay is measured for each transmitter m within each transmission region n of the system. The loop back delay represents the time required for the regional controller Cn to originate the delay measurement signal and then to receive the delay measurement signal after being transmitted by transmitter m. $TCnXmn$ ($TCnX1n$ and $TCnX2n$ in FIG. 3A) is the inter-regional transmitter delay, the delay encountered in the transmission of the delay measurement signal from the regional controller Cn to the regional transmitter Xm in region n. $TXmnRjn$ ($TX1nR1n$ and $TX2nR1n$ in FIG. 3A) is the RF delay encountered in the transmission of the delay measurement signals between the selected transmitter Xm and regional receiver Rj in region n. This parameter is calculated in a manner well known in the art, and is based on the propagation time required for the delay measurement signal to travel the measured distance between the selected regional transmitter Xm and the regional receiver Rj. $TRjnCn$ ($TR1Cn$ in FIG. 3A) is the receiver delay, or delay encountered in the transmission of the delay measurement signal between the regional receiver Rj and the regional controller Cn in region n.

Once the loop back delay has been measured, the transmitter delay can be computed as follows:

$$TCnXmn = TmCnCn - TXmnRjn - TRjnCn$$

It will be appreciated from the equation presented above, only two of the three quantities on the right hand side of the equation are known at this time, $TmCnCn$ which is the loop back delay measured, and $TXmnRjn$ which is the computed RF delay. $TRjnCn$ remains as of yet unknown, and as a result, the actual value for the transmission delay is unknown and cannot be computed. As will be shown below, an actual value for $TRjCn$ need not be known to determine the transmission delays which are required to synchronize the regional transmitter transmissions within the simulcast transmission system of the present invention.

After the loop back delays for each transmitter have been measured, the inter-regional differential propagation delays are computed by subtracting the computed transmission delays for the 'mth' transmitter within each transmission region n from the 'ref', or reference transmitter within each transmission region n.

$$\begin{aligned}\Delta Trefmn &= TCnXrefn - TCnXmn \\ &= TrefCnCn - TXrefRkn - TRjCn - TmCnCn + TXmnRkn + TRjCn \\ &= TrefCnCn - TXrefRkn - TmCnCn + TXmnRkn\end{aligned}$$

As can be observed in the above equation, all of the values on the right side of the equation are now known since the unknown quantity TRjCn drops out of the equation when a common receiver is used for the loop back delay measurements. It will be appreciated, any transmitter within each transmission region may be designated as the reference transmitter for the purposes of the differential propagation delay calculations. Depending upon the magnitude of the loop back delay and the RF delay for the reference transmitter Xref within each transmission region n compared to that of the other transmitters within the transmission region n, it will also be appreciated, additional delay may have to be added to, or subtracted from, each of the transmission paths of the transmitters within the particular region in order to synchronize the transmission delays of all transmitters within the particular transmission region.

The transmission delay which is inserted into, or removed from, each transmitter transmission path is calculated as follows:

$$\text{Transmission Delay}(Xmn) = \Delta Trefn - \Delta Tmn$$

where the transmission delay for transmitter m in region n, Xmn, is computed by subtracting the differential propagation delay of the mth transmitter ($\Delta Tmn$) from the differential propagation delay ($\Delta Trefn$) for the reference transmitter within region n. An alternate method of determining the additional transmission delay would be to determine the maximum differential propagation delay $\Delta TMAXn$ of all transmitters in region n and to then subtract the differential propagation delay of the mth transmitter ($\Delta Tmn$) in order to determine the additional transmission delay required.

$$\text{Transmission Delay}(Xmn) = \Delta TMAXn - \Delta Tmn$$

FIG. 3B is a signal flow diagram for the intra-regional propagation delay measurements. The intra-regional propagation delay measurements are initiated by the master controller which generates a measurement control signal which is suitably encoded to select one of the regional controllers in the transmission region in which the measurement is to be made, and also identifies the measurement as an intra-regional propagation delay measurement. Unlike the inter-regional propagation delay measurements, the master controller generates both the measurement control signal and the delay measurement signal for the intra-regional propagation delay measurements.

In order to determine the intra-regional propagation delays, the loop back delay for a selected transmitter Xmn within a selected transmission region n with the master controller M generating the delay measurement signal is measured. The loop back delay is defined as $$TMCnCn = TMXmn + TXmnRjn + TRjnCn$$

where TMCnCn is the loop back delay which is being measured for the selected transmitter within transmission region n. The loop back delay represents the time required for the master controller M to originate the delay measurement signal and for the regional controller to receive the delay measurement signal after being transmitted by the selected transmitter. TMXmn (TMX1n in FIG. 3B) is the intra-regional transmitter delay, the delay encountered in the transmission of the delay measurement signal from the master controller M to the regional transmitter Xm in region n. TXmnRjn (TX1nR1n in FIG. 3B) is the RF delay encountered in the transmission of the delay measurement signals between the selected transmitter Xm and regional receiver Rj in region n, as described above. TRjnCn (TR1nCn in FIG. 3B) is the receiver delay, or delay encountered in the transmission of the delay measurement signal between the regional receiver Rj and the regional controller Cn in region n.

The loop back delay for a selected transmitter Xm within an adjacent transmission region k with the master controller M generating the delay measurement signal is next measured. The loop back delay for this measurement is defined as $$TMCkCn = TMXmk + TXmkRjn + TRjnCn$$

where TMCkCn is the loop back delay which is being measured for the selected transmitter Xm within transmission region k. The loop back delay represents the time required for the master controller M to originate the delay measurement signal which is routed through regional controller Ck, and for the regional controller Cn to receive the delay measurement signal after being transmitted by the selected transmitter Xm in region k. TMXmk (TMX1k in FIG. 3B) is the intra-regional transmitter delay, the delay encountered in the transmission of the delay measurement signal from the master controller M to the regional transmitter Xm in region k. TXmkRjn (TX1kR1n in FIG. 3B) is the RF delay encountered in the transmission of the delay measurement signals between the selected transmitter Xm in region k and regional receiver Rj in region n, as described above. TRjnCn (TR1nCn in FIG. 3B) is the receiver delay, or delay encountered in the transmission of the delay measurement signal between the regional receiver Rj and the regional controller Cn in region n.

Figure 3C:
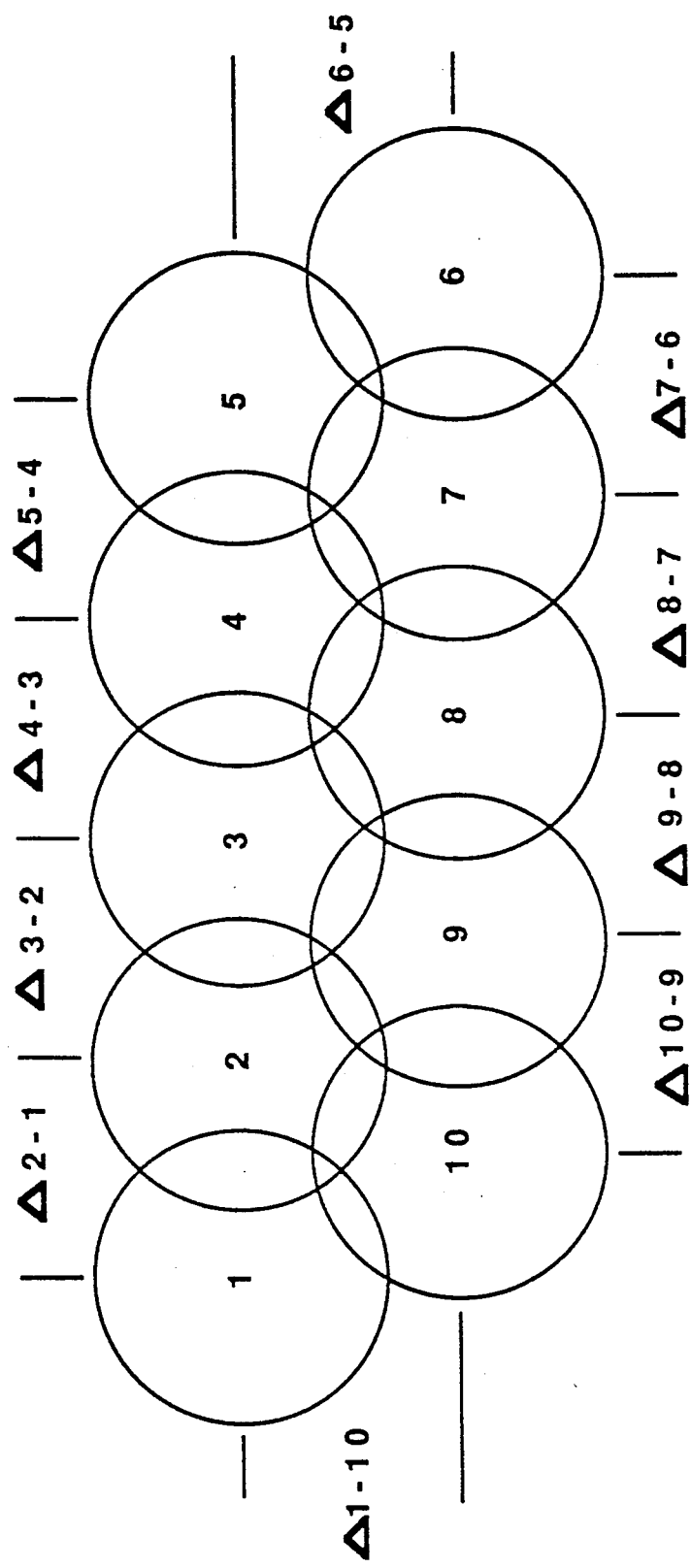
FIG. 3C is a diagram illustrating one embodiment of an intra-regional differential propagation delay measurement sequence utilized in the simulcast transmission system of the present invention.

Loop back delay measurements as described above are required for selected transmitter pairs within each adjacent pair of the plurality of transmission regions as shown in FIG. 3C for a large transmission system having a large number of transmission regions. It will be appreciated more or less transmission regions may be required in a particular simulcast transmission system, than that shown as an example in FIG. 3C.

Returning to FIG. 3B, once the loop back delays has been measured for each adjacent pair of transmission regions n and k, the transmitter delays for region n and k are computed as follows:

$$TMXmn = TMCnCn - TXmnRjn - TRjnCn \text{ and}$$

$$TMXmk = TMCkCn - TXmkRjn - TRjnCn$$

It will again be appreciated, as in the inter-regional differential propagation delay calculations, only two of the three quantities on the right hand side of the equations above are known at this time, TMCnCn and TMCkCn which are the loop back delays measured, and TXmnRjn and TXmkRjn which are the computed RF delays.

After the intra-regional loop back delay measurements are made for each adjacent pair of transmission regions, the intra-regional differential propagation delays are computed by subtracting the computed transmission delays for the 'mth' transmitter within each transmission region k from the 'mth' transmitter within each adjacent transmission region n.

$$\Delta TMnk = TMXmn - TMXmk$$
$$= TMCnCn - TXmnRjn - TRjCn - TMCkCn + TXmkRjn + TRjCn$$
$$= TMCnCn - TXmnRjn - TMCkCn + TXmkRjn$$

As can be observed in the above equation, all of the values on the right side of the equation are now known from the intra-regional propagation delay measurements made for each adjacent pair of transmission regions. The intra-regional differential propagation delay calculations resulting from the intra-regional propagation delay measurements are shown in FIG. 3C as $\Delta 2-1$, $\Delta 3-2$, and so forth. While a sequential progression of intra-regional propagation delay measurements are indicated to obtain the intra-regional differential propagation delay results shown in FIG. 3C, it will be appreciated other combinations of transmission region pairs, such as region 10 with region 2, region 9 with region 2, and so forth, can be selected for the measurement and computation of intra-regional differential propagation delays required to synchronize the message transmissions in the system.

Since the inter-regional differential propagation delay values for each transmission region are independently derived for each transmission region, the inter-regional differential propagation delay values can be simply compared to determine the maximum inter-regional differential propagation delay for all transmission regions within the simulcast transmission system as described above. The computations of the additional transmission delays for each transmitter in each transmission region is therefore straight forward. However the intra-regional differential propagation delay calculations rely on measurements made using at least n−1 transmission region pairs. As a result the determination of the additional transmission delays required to synchronize the intra-regional transmissions is considerably more complicated. One approach determines the additional transmission delays for groups of transmission regions. One example of this approach is to synchronize the transmissions between regions 1, 2 and 3 of FIG. 3C using the intra-regional differential propagation delay values $\Delta 2-1$ and $\Delta 3-2$. Likewise, regions 3, 4 and 5 could be synchronized using the intra-regional differential propagation delay values $\Delta 4-3$ and $\Delta 5-4$. Regions 1, 2 and 3 would then be synchronized with regions 3, 4 and 5, since each group of regions shares the measurements made in common in region 3. Regions 6-10 would be synchronized in a similar manner as for regions 1-5. One or both of the intra-regional differential propagation delay values $\Delta 6-5$ and $\Delta 1-10$ would then be used to synchronize the transmissions between the larger transmission region groups. It will be appreciated, other methods may be utilized to synchronize the intra-regional transmissions, such as sequentially equalizing each transmission region with the previously synchronized transmission regions. In this method region 2 is synchronized to region 1, and then region 3 is synchronized to regions 1 and 2, and so forth until all transmission regions are synchronized.

Because of the simplicity of the measurements and the basic calculations for determining the intra-regional transmission delays, the same set of measurements can be made with any of the transmitters within each transmission region. Consequently, several measurements can be made using several transmitters to check the accuracy of the measurements and provide cross checking of the measurements. In addition, since no additional switching hardware is required as in the prior art systems, any transmitter within each transmission region can be used as a back-up provided the transmission can be received by a receiver in the adjacent region pair. This is extremely advantageous should the transmitter selected as the reference become inoperative.

Figure 4:
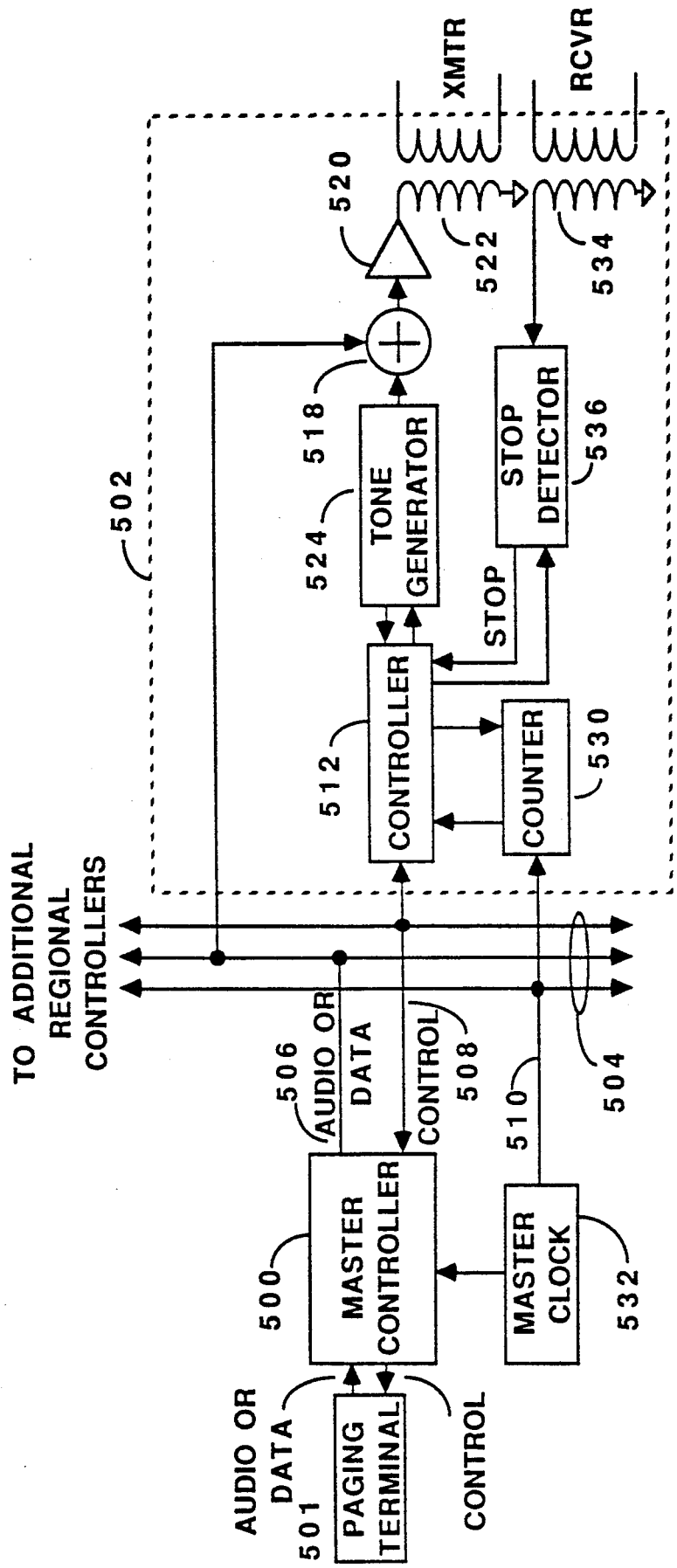
FIG. 4 is an electrical block diagram showing a first embodiment for the implementation of the regional controllers utilized in the simulcast transmission system of the present invention.

FIG. 4 shows an electrical block diagram of the regional controllers 502 utilized in a first embodiment of the present invention. A second embodiment of the present invention is shown and will be described in FIG. 8. In the embodiment of the present invention shown in FIG. 4, the master controller 500 and regional controllers 502 are co-located in a common area, such as being mounted in a common card rack in a central office building. The master controller 500 shares common "backplane" interconnections 504 with each of the regional controllers 502 for communication of control signals 508, such as the measurement control signals, and audio and data signals 506, such as the delay measurement signals generated by the master controller 500 for the intra-regional propagation delay measurements. As a result of the close proximity between the master controller 500 and each of the regional controllers 502 through the common "backplane" 506, measurement errors encountered in the intra-regional propagation delay measurements are minimized. The signal delays between the master controller 500 and the regional controllers 502 are on the order of hundreds of nanoseconds, as compared to the propagation delays encountered through the audio and data signal paths which are tens to hundreds of microseconds duration, at least several orders of magnitude greater in duration.

In normal operation, wherein messages are being transmitted by the simulcast transmitter system, the messages to be transmitted, which may be analog tone and voice information or binary data is coupled to the master controller 500 from the paging terminal 501. The audio and data messages are coupled from the master controller 500 through the "backplane" interconnections 504 into the input of each of the regional controllers 502. The audio and data messages couple from the output of paging terminal 501 to the input of the master controller 500. One method of processing of the tone and voice signals and binary data signals by the master controller is described in U.S. Pat. No. 4,721,955 issued Jan. 26, 1988 to Dunkerton et al, entitled "Paging Universal Remote Control System" which is assigned to the assignee of the present invention. The output of master controller 500 couples through the "backplane" interconnections 504 into the input of summing circuit 518. The output of the summing circuit 518 couples to the input of output amplifier 520 which amplifies the signal for transmission to the regional transmitters. The output of output amplifier 520 couples to line transformer 522 which couples the signal to a communication circuit, such as a telephone line. The telephone line can either directly connect to one or more of the regional transmitters, or to one or more link transmitter/- receiver pairs for the transmission of the information out to the regional transmitters. As will be appreciated from the description to follow, regional controller 502 provides only minimal control of the normal paging message transmissions, but is primarily involved in the control of the measurement of propagation delays throughout the transmission system.

The master controller 500 periodically initiates propagation delay measurements, as previously described above. When the master controller 500 initiates inter-regional and intra-regional propagation delay measurements, the master controller generates control signals which couple from the control output 508 of the master controller 500 to the input of paging terminal 501. The control signals are suitably encoded to provide a number of control functions, and include such functions as the request to terminate normal paging transmissions when propagation delay measurements are to be made, and the request to initiate normal paging transmission, when propagation delay measurements are completed.

When the master controller 500 initiates inter-regional propagation delay measurements, the master controller also generates control signals which couple from the control output 508 of the master controller 500 to the input of controller 512 through the "backplane" interconnections 504. The control signals are suitably encoded to provide a number of control functions, such as the request to initiate propagation delay measurements, selection of one or more regional controllers for sequential or simultaneous inter-regional propagation delay measurements as previously described, and control of the intra-regional propagation delay measurement sequences. The controller 512 in each of the regional controllers 502 also communicates acknowledge back signals and data to the master controller 500 through the control output 508 during the propagation delay measurements. The encoded control signals coupled to the regional controller 502 are decoded by controller 512, which in the preferred embodiment of the present invention is implemented using a micro-computer, such as a Motorola MC6805HC11 microcomputer. The use of a microcomputer to provide the required decoding and control functions is well known in the art. When the control signal to terminate normal paging operation is received by the controller 512, the signal is decoded, whereupon the controller 512 completes the control of the transmission of any messages which may remain in queue within the paging terminal 501. Controller 512 next generates a control signal which then couples to the input of tone generator 524, which generates the delay measurement signal.

Figure 5A:
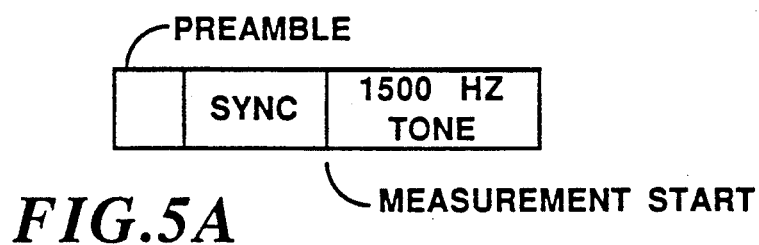
FIG. 5A is a signal waveform showing the delay measurement utilized in the simulcast transmission system of the present invention.
Figure 5B:
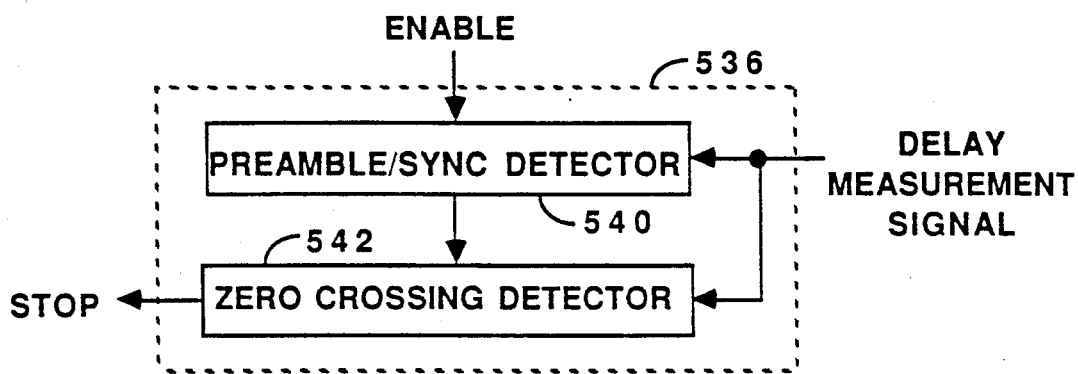
FIG. 5B is an electrical block diagram showing the stop detector utilized in the first embodiment of the simulcast transmission system of the present invention.

FIG. 5A shows the signal waveform of the delay measurement signal generated by tone generator 524 in the preferred embodiment of the present invention. The delay measurement signal is encoded at 1200 bits per second, and utilizes minimum shift keying (MSK) modulation using 1200 Hertz and 1800 Hertz signaling tones representing the one/zero values for the preamble and synchronization signals. As shown in FIG. 5A, the delay measurement signal comprises a first part, a short preamble codeword comprising an alternating one/zero pattern to provide bit synchronization, and a synchronization word to provide word synchronization. The second portion of the delay measurement signal codeword is a modulated 1500 Hertz tone used to provide a fine measurement signal.

Returning to FIG. 4, the output of tone generator 524 couples to a second input of summing circuit 518. The output of the summing circuit 518 couples to the input of output amplifier 520 which amplifies the signal for transmission to the regional transmitters. The output of output amplifier 520 couples to line transformer 522 which couples the signal to a communication circuit, such as a telephone line.

Controller 512 as, previously described, couples to counter 530, triggering counter 530 to begin counting when the zero crossing of the 1500 Hz portion of the delay measurement signal is detected. The delay measurement signal propagates from the regional controller output of line transformer 522 to the selected regional transmitter. The delay measurement signal is next transmitted by the selected regional transmitter and received by the regional receiver. The output of the regional receiver couples through a communication link to the input of the regional controller through line transformer 534. The communication link may be implemented using any of a number of well known techniques, such as, but not limited to, wireline, link transmitter/receivers and microwave transmission. Line transformer 534 couples to an input of stop detector 536, shown in FIG. 5B, which generates a stop signal output. After controller 512 has started counter 530, controller 512 generates an enable signal which enables the stop detector 536. The preamble and synchronization codeword signals couple to the input of preamble/sync detection circuit 540, obtaining bit and word synchronization. Such synchronizers are well known in the art. Upon obtaining word synchronization, preamble/sync detector circuit 540 generates an enable signal which couples to zero crossing detector circuit 542. Zero crossing detector circuit 542 responds to the zero crossings within the 1500 Hz tone transmitted following the synchronization codeword to obtain a more precise measurement of the total propagation delay. The zero crossing detector circuit 542 thereupon generates a counter stop command which couples to controller 512 enabling controller 512 to then stop the count of counter 530.

Returning to FIG. 4, controller 512 then stores the count obtained within a random access memory (not shown). The random access memory is the on-board RAM of the microcomputer when a small number of measurements are being made. When a large number of measurements are made due to a large number of transmitters within the transmission region, additional RAM is provided at the regional controller. Once the inter-regional and intra-regional propagation delay measurements have been completed, as will be further described below, the required transmission delays are calculated for each transmitter within the transmission regions, as described above. The transmission delay information is then encoded and coupled from the output of controller 512 to the input of tone generator 524, which modulates the information for transmission to each transmitter site.

Figure 6:
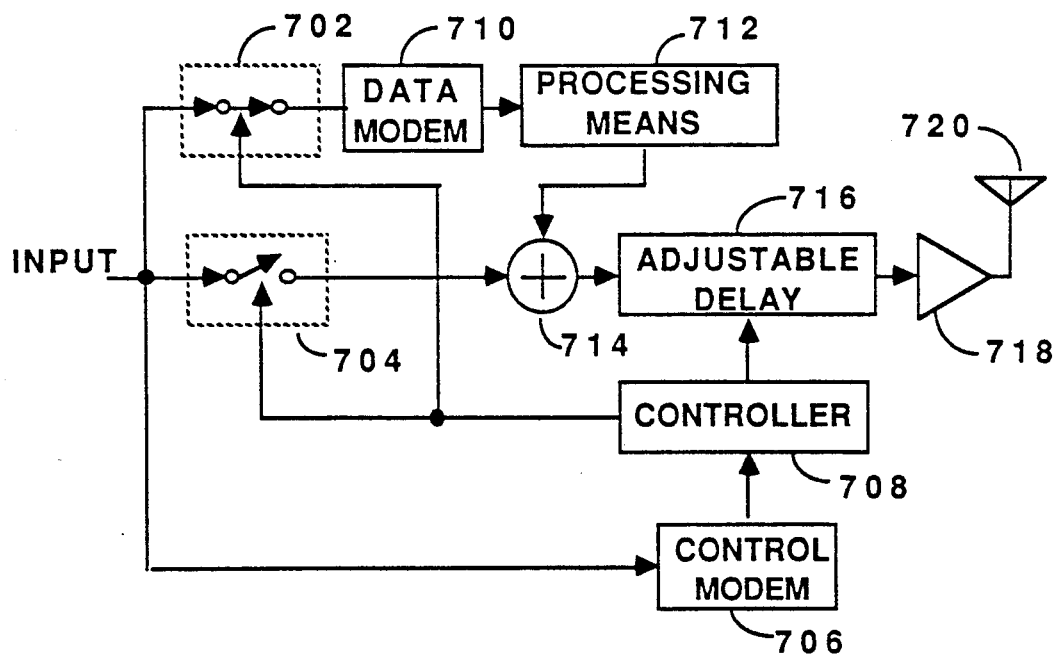
FIG. 6 is an electrical block diagram showing the transmitter utilized in the first embodiment of the simulcast transmission system of the present invention.

FIG. 6 is an electrical block diagram of a first embodiment of the regional transmitter utilized in the preferred embodiment of the present invention. A second embodiment of the regional transmitter of the present invention is shown and will be described below in FIG. 9. In normal operation, the signaling information which is received from the regional controller couples to the input of switch means 702, the input of switching means 704 and the input to control modem 706. Detailed description of the operation of the regional transmitters during normal operation is provided in U.S. Pat. No. 4,721,955 to Dunkerton et al., entitled "Paging Universal Remote Control System" which was previously described above. In normal operation, the control information is received by control modem 706, which demodulates the modulated control signals to provide at the output of control modem 706 a stream of binary information corresponding to the control signal transmitted from the regional controller. The output of control modem 706 couples to the input of controller 708. Controller 708 is implemented utilizing a microcomputer, such as an MC6805HC11 microcomputer manufactured by Motorola. Controller 708 decodes the controls signals, and depending upon the control signals received, the controller 708 enables switching means 704 to provide a signal path for analog information, or enables switching means 702 to provide a signal path for data. The output of switching means 702 couples to the input of data modem 710. Data modem 710 converts the analog modem signals to digital data signals in a manner well known in the art. The digital data signals couple to processing circuit 712 which processes the digital data signals for transmission in a manner well known in the art. The output of processing circuit 712 and switching means 704 couple to separate inputs of summing circuit 714. The output of summing circuit 714 couples to the input of adjustable delay 716 which provides the required transmission delay for simulcast operation at each regional transmitter. Adjustable delay 716 is programmable by controller 708. Programmable adjustable delay elements are well known in the art, providing any of a number of programmable delay resolutions. Such delay elements provide programmable predetermined resolutions, such as in 1 microsecond and ten microsecond increments and a wide range of total delay adjustment. Where transmission delays exceed the capabilities of the programmable delay elements, fixed delay elements are provided to maintain a nominal operating range over which the transmission delays may be adjusted during the normal course of correcting for variations in the measured propagation delays.

The output of adjustable delay 716 couples to the input of the transmitter means 718. Transmitter means 718 includes such elements as the channel elements, exciter and power amplifiers to provide for transmission of the voice or data information. The output of transmitter means 718 couples to antenna 720 which provides for the transmission of the voice and data information in a manner well known in the art.

As previously described, after the measurement of the differential propagation delays have been measured throughout the transmission system, the regional controllers transmit to each of the regional transmitters information indicating the value of transmission delay required for each transmitter to synchronize the transmissions throughout the system. The transmission delay information is received by control modem 706, which couples the demodulated information to controller 708 which decodes the information deriving the transmission delay information pertinent to each regional transmitter. Controller 708 then programs adjustable delay 716, and upon completion returns an acknowledgement signal to the regional controller through control modem 706, indicating the adjustment has been completed, and the regional transmitter is ready to begin normal paging operation.

Figure 7A:
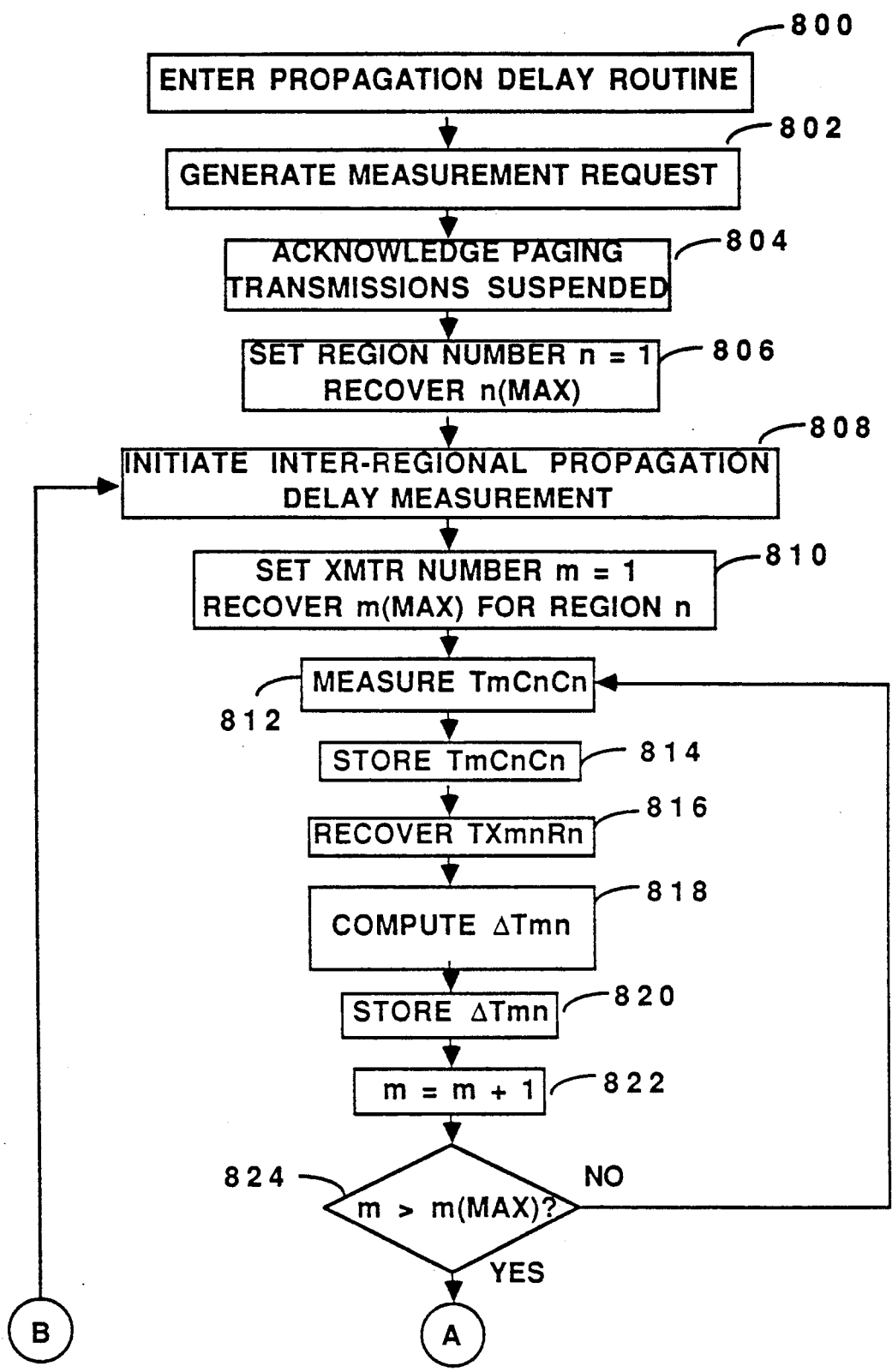
FIGS. 7A-7C are flow charts showing the procedures for equalizing the propagation delays of the simulcast transmission system of the present invention.
Figure 7B:
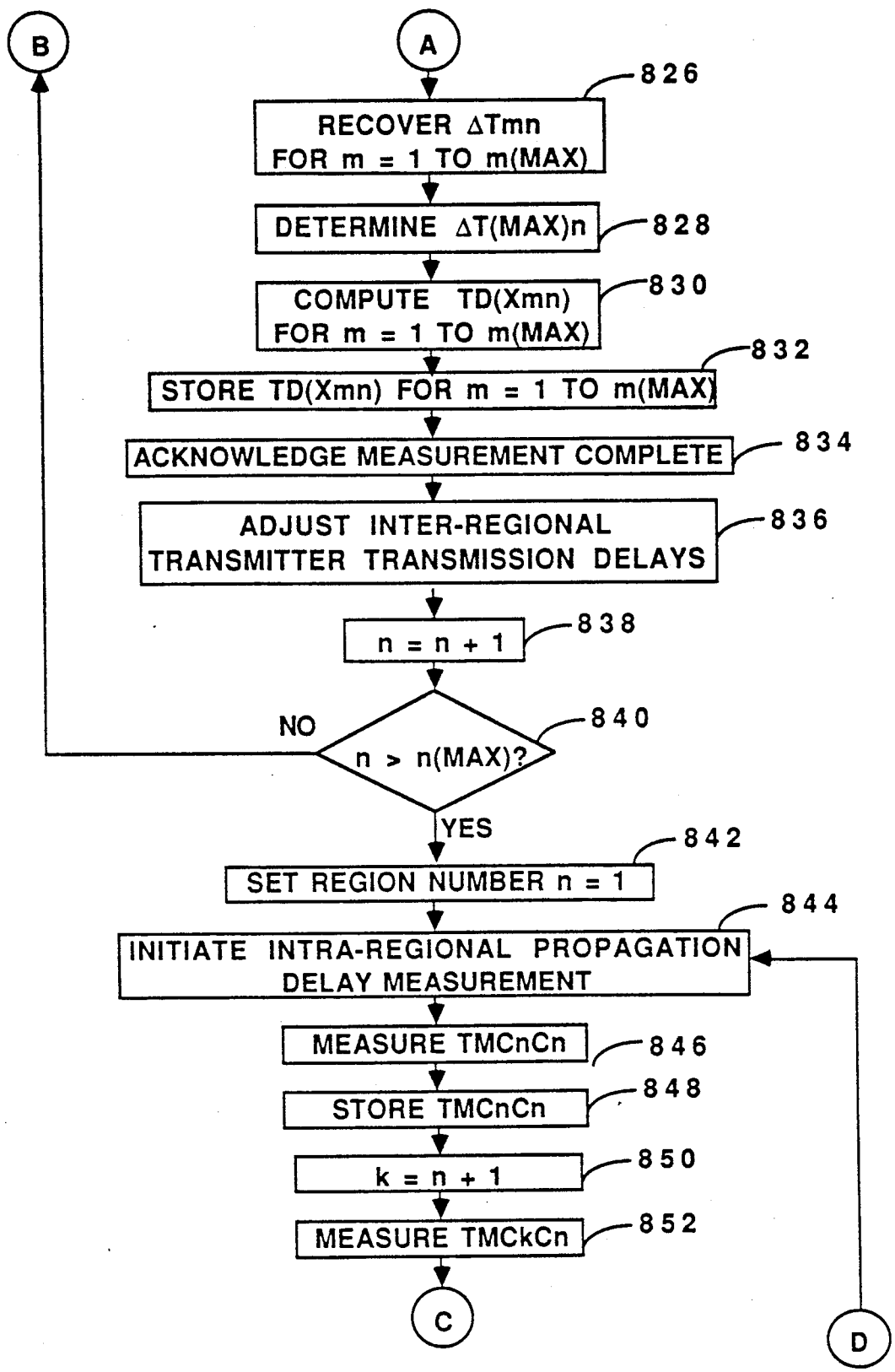
Figure 7C:
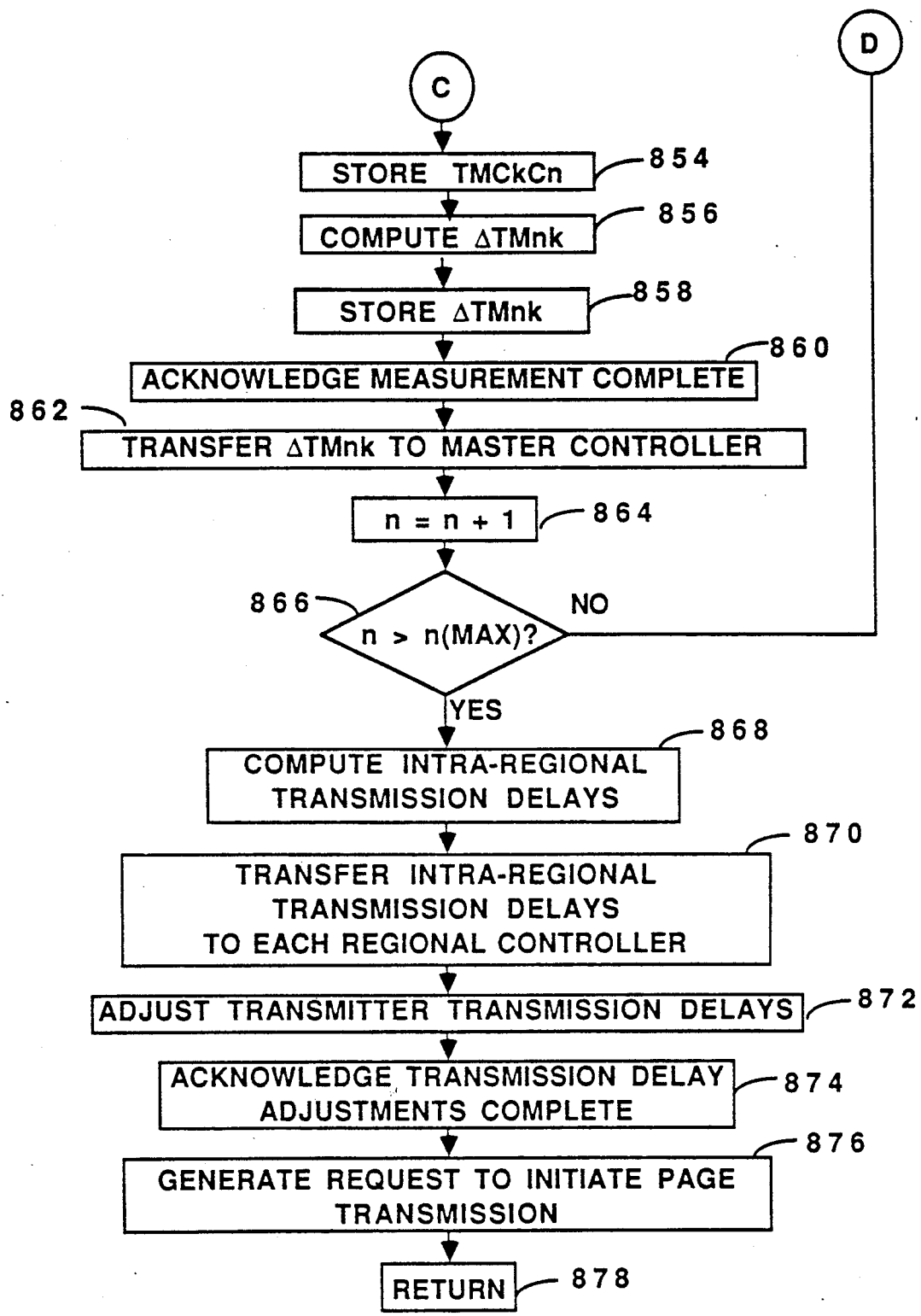

FIGS. 7A-C are flow charts describing the operation of the preferred embodiment of the present invention. At the appropriate time selected to begin the propagation delay measurements, the master controller enters the routine for measurement of the propagation delays at step 800. Entry into step 800 is through an interrupt which is generated either daily at a predetermined time, or at some other suitable measurement interval, as described above. The master controller generates a request to the paging terminal to suspend normal paging operations, at step 802. Upon receiving the request to suspend normal paging operations, the paging terminal proceeds to finish the transmission of any messages which are in the current paging queue, after which the paging terminal terminates any further transmissions. New messages which are received during the propagation delay measurement time interval are stored in message queues within the paging terminal. The paging terminal acknowledges to the master controller that transmissions of messages are suspended, at step 804. The master controller begins the sequence of propagation delay measurements by selecting one or more regions in which delay measurements are to be made. For the sake of simplicity, it will be assumed the master controller will sequentially cycle through each transmission region in a predetermined sequence. Again for simplicity, it is assumed each of the regions is numbered, beginning with region 1 and ending with region n. The master controller begins the propagation delay measurements, in this example, by initializing a register storing the region count to $n=1$ and further recovering from memory the total number of regions, n(Max), which are to be sequenced, at step 806. It will be appreciated that the master controller could have only recalled the maximum number of regions, and rather than incrementing the register to the maximum number of regions, could have loaded the register with the maximum number and decremented the register in an alternate method for selecting the regions. The master controller generates a control signal which informs the selected regional controller to initiate the inter-regional transmission delay measurements, at step 808. The selected regional controller then initializes a register storing the transmitter count to $m=1$ to select the first transmitter for which an inter-regional propagation delay measurement is to be made, at step 810. For purposes of simplicity, it is assumed the first transmitter selected will also be identified as the reference transmitter for the purpose of calculating the differential propagation delays for each transmitter within the transmission region in the description to follow. The regional controller also recovers from memory the number of transmitters m(MAX) that are within the transmission region, at step 810. It will be appreciated the register used to select the regional transmitters could have been loaded with the maximum number of transmitters, and decremented, as described above. The loop back delay measurement, TmCnCn, is made for transmitter $m=1$ by the regional controller, at step 812. The measured value of the loop back delay for transmitter $m=1$ is then recovered from the propagation delay measurement counter and stored in an array in memory, at step 814. The regional controller recovers the value of the RF delay, TXmnRn, from an array location in memory, at step 816. The RF delays are calculated for each transmitter based on the distance between the selected regional transmitter and the regional receiver. The regional controller then computes the differential propagation delay for the measured transmitter, $\Delta Tmn = T1CnCn - TX1Rn - TXmCnCn + TXmRn$, at step 818. The computed differential propagation delay $\Delta Tmn$ is stored for transmitter m, which in this case is transmitter 1, in an array location in memory at step 820. It will be appreciated, since transmitter 1 is also the reference transmitter, the value of this calculation would result in the differential propagation delay measurement yielding a value of zero. It will also be appreciated depending on the relative magnitude of the propagation delay for transmitter 1 compared to the other transmitters within the transmission region, the differential propagation delay values determined for the other transmitters may provide positive, zero, and negative differential propagation delay values.

The regional controller increments the register storing the transmitter count, at step 822, and checks to see if the value of m has exceeded the number of transmitters within the transmission region, at step 824. If the value of m has not exceeded the number of transmitters within the transmission region, at step 824, the loop back delay is measured for the next transmitter in the measurement sequence, at step 812. Steps 812 through 824 are repeated until a measurement of the propagation delay of all transmitters within the transmission region have been completed.

The regional controller next recovers from memory the values of the differential propagation delays previously calculated, at step 826 of FIG. 7B, to determine the largest differential propagation delay $\Delta Tn(MAX)$ within the selected transmission region, at step 828. The inter-regional transmission delay, $TD(Xmn)$, for each transmitter within the transmission region is then computed, at step 830, and stored, at step 832. It will be appreciated the value $\Delta TnRef$ could be substituted for $\Delta Tn(MAX)$ as previously described. The inter-regional transmission delay is the delay that must be added to or subtracted from each regional transmitter to synchronize the propagation delays within the transmission region. The regional controller next transmits to each regional transmitter within the transmission region the values of the inter-regional transmission delays required for each transmitter to equalize the inter-regional transmission delays, at step 834, where upon each regional transmitter adjusts the programmable delay elements for the additional transmission delay required, as described above.

The regional controller then acknowledges completion of the inter-regional propagation delay measurements for the transmission region, at step 836. It will be appreciated the actual acknowledgement of the completion of the inter-regional delay measurements could have occurred immediately after the last transmitter measurement was made, and that the actual computations described, and inter-regional transmission delay adjustments could have taken place during the time measurements are being made in the next transmission region. The master controller then increments the register storing the region count, at step 838, and compares the new value to the total number of regions in the system, at step 840. If the value of n is less than the total number of regions, at step 840, the master controller returns to step 808, initiating the propagation delay measurements for the next transmission region. Steps 808 through 840 are repeated until inter-regional propagation delay measurements and transmitter adjustments have been made in all transmission regions within the simulcast transmission system. When inter-regional propagation delay measurements have been made in all transmission regions, as determined at step 840, the master controller returns the register storing the region count to 1, at step 842. The master controller next initiates the intra-regional propagation delay measurement for the transmission region selected, which in this case is N=1, at step 844. Again for the sake of simplicity, the regional controller selects transmitter 1 as the reference transmitter, at step 844. The signal to initiate the intra-regional propagation delay measurement from the master controller, at step 844, initiates the timing of the counter in the regional controller, thereby allowing the regional controller to measure the intra-regional loop back delay TMCnCn, at step 846. The value of the measured intra-regional loop back delay TMCnCn is stored in an array in memory, at step 848, which in this example is for transmission region 1. The number of the next adjacent region k is determined at step 850. The master controller next initiates the intra-regional delay measurement TMCkCn from a selected transmitter in the adjacent transmission region k, at step 852. The value of the measured intra-regional loop back delay TMCkCn is stored in an array location in memory, at step 854. The intra-regional loop back delay measurement TMCnCn and RF delay TXmnRjn for the selected transmitter in region 1 is recovered from the array location in memory as well as the intra-regional loop back delay measurement TMCkCn and the RF delay TXmkRjn for the selected transmitter in the adjacent transmission region pair, and the differential intra-regional propagation delay $\Delta Mnk$ is calculated, at step 856, and is stored in an array location in memory, at step 858. The regional controller acknowledges completion of the intra-regional propagation delay measurement, at step 860, and transfers the value for the differential propagation delay measurement $\Delta TMnk$ to the master controller, at step 862, which then stores the information in an array in memory for use at a later time. The master controller then increments the register storing the region count, at step 864, and checks to see if the computed value exceeded the value for the maximum number of regions in the system, at step 866. If the value computed does not exceed the number of transmission regions, at step 866, the master controller returns to step 844 to initiate the intra-regional propagation delay measurement in the next transmission region.

When the value computed at step 866 exceeds the number of regions in the system, the master controller computes the intra-regional transmission delays required each transmission region to equalize the intra-regional propagation delays for the entire system, at step 868. The computed values for the intra-regional transmission delays for each transmission region is transferred to each of the regional controllers, at step 870. Each regional controller then transmits the intra-regional transmission delay values to each of the regional transmitters. The regional transmitter controller then programs the programmable delay elements, at step 872. Each regional transmitter then acknowledges completion the the transmission delay programming to the regional controllers, which then acknowledge completion of the programming to the master controller, at step 874. The master controller then generates a request to initiate page transmissions to the paging terminal, at step 876, and returns to the normal paging transmissions, at step 878, until the next time interval at which time new propagation delay measurements are to be made.

While the description provided above described the inter-regional propagation delay measurements and computations as being made before the intra-regional propagation delay measurements and computations, it will be appreciated, the order of the measurements and computations can be interchanged, and still provide the same results as described above.

Figure 8:
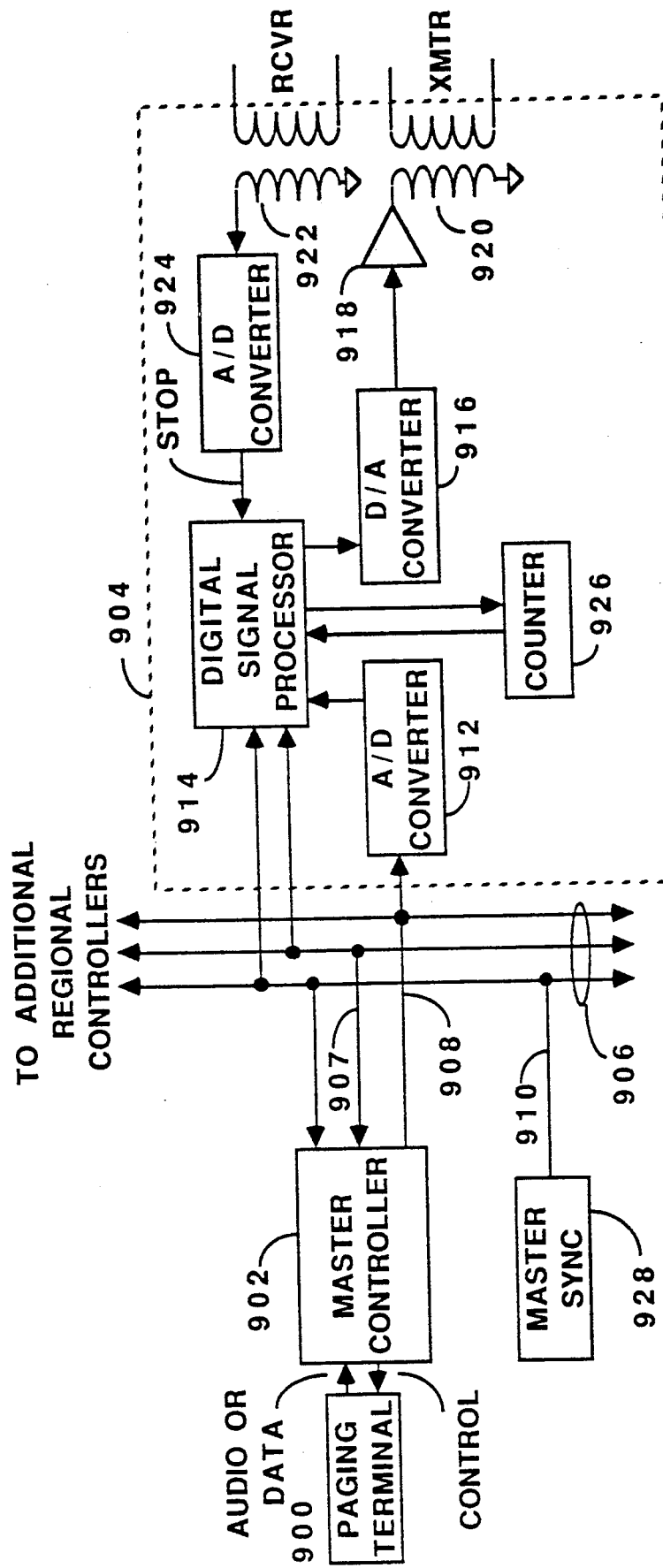
FIG. 8 is an electrical block diagram showing a second embodiment for the implementation of the regional controllers utilized in the simulcast transmission system of the present invention.

FIG. 8 is an electrical block diagram of a second embodiment of the regional controller utilized in the preferred embodiment of the present invention. In the second embodiment of the present invention, the master controller 902 and regional controllers 904 are co-located in a common area, such as being mounted in a common card rack in an office building. The master controller 902 shares common "backplane" interconnections 906 with each of the regional controllers 904. The "backplane" interconnections provide a communication path 907 between the master controller and the regional controllers, an audio or data path 908, and a control signal path 910. The audio signals 907 include signals such as message signals comprising tone encoded data signals, and the delay measurement signals generated for the intra-regional propagation delay measurements. The control signals 908 comprise such signals as the measurement control signals, transmitter selection and keying signals, and other communication between the master and regional controllers. The master sync generator 928 generates a continuous sequence of synchronization signals which are used by the master and regional controllers to maintain synchronization of individual on-board timing generators (not shown), and to synchronize the intra-regional propagation delay measurements, as will be described below.

In normal operation, wherein messages are being transmitted by the simulcast transmitter system, the tone encoded binary data messages are coupled to the master controller 902 from the paging terminal 900. The messages are then coupled from the master controller 902 audio signal output 908 through the "backplane" interconnections 906 into the input of A/D converter 912 in each of the regional controllers 904. The tone encoded data messages are processed by A/D converter 912 to form a stream of digital information representative of the binary data being transmitted. The output of A/D converter 912 couples to an input of the digital signal processor 914 which processes the information by adding the appropriate transmitter control information, coupling the processed information to the D/A converter 916, which encodes the information for transmission to the regional transmitters. The encoded message information is coupled to the input of output amplifier 918 which amplifies the signal for transmission to the regional transmitters. The output of output amplifier 918 couples to line transformer 920 which couples the signal to a communication circuit, such as a telephone line. The telephone line can either directly connect to one or more of the regional transmitters, or to one or more link transmitter/receiver pairs for the transmission of the information out to the regional transmitters. As will be appreciated from the description to follow, regional controller 904 provides only minimal control of the normal paging message transmissions, but is primarily involved in the control of the measurement of propagation delays throughout the transmission system.

The master controller 902 periodically initiates propagation delay measurements, as previously described above. When the master controller 902 initiates inter-regional and intra-regional propagation delay measurements, the master controller generates control signals which couple from the control output of the master controller 902 to the input of paging terminal 900. The control signals are suitably encoded to provide a number of control functions, and include such functions as the request to terminate normal paging transmissions when propagation delay measurements are to be made, and the request to initiate normal paging transmission, when propagation delay measurements are completed.

When the master controller 902 initiates inter-regional propagation delay measurements, the master controller generates a delay measurement control signal which couples from the control output 908 of the master controller 902 to the input of regional controller 904 through the "backplane" interconnections 906. The control signal is encoded to provide for the request to initiate propagation delay measurements, and the selection of one or more regional controllers for sequential or simultaneous inter-regional propagation delay measurements as previously described. The control signal couples through the communication link 907 between the master controller 902 and the digital signal processor (DSP) 914. The DSP 914 in each of the regional controllers 904 also communicates acknowledge back signals and data to the master controller 902 through the communication link 907 during the propagation delay measurements. The encoded control signals coupled to the regional controller 904 are decoded by DSP 914, which in the preferred embodiment of the present invention is implemented using a digital signal processor circuit, such as a Motorola DSP 56000 digital signal processor integrated circuit. The use of digital signal processors to provide the required decoding and control functions is well known in the art. When the signal to terminate normal paging operation is received by the DSP 914, the signal is decoded, whereupon the DSP 914 completes the control of the transmission of any messages which may remain in queue within the paging terminal 900.

When the DSP 914 completes the transmission of any messages remaining in queue from the paging terminal 900, the DSP 914 generates the delay measurement signal, coupling the signal to the input of D/A converter 916 which encodes the signal for transmission. The output of D/A converter 916 couples to the input of output amplifier 918 which amplifies the signal for transmission to the regional transmitters. The output of output amplifier 918 couples to line transformer 920 which couples the signal to a communication circuit, such as a telephone line.

DSP 914 also couples to counter 926, triggering counter 926 to begin counting. The delay measurement signal propagates from the regional controller output of line transformer 920 to the selected regional transmitter. The delay measurement signal is next transmitted by the selected regional transmitter and received by the regional receiver. The output of the regional receiver couples through a communication link to the input of the regional controller through line transformer 922. The communication link may be implemented using any of a number of well known techniques, such as, but not limited to, wireline, link transmitter/receivers and microwave transmission. Line transformer 922 couples to an input of A/D converter 924 which generates a stream of binary information corresponding to the received delay measurement signal. The output of A/D converter 924 couples to an input of DSP 914 which processes the received information to locate the synchronization portion of the delay measurement signal. Upon detecting the end of the synchronization portion of the delay measurement signal, the DSP then samples the received unmodulated carrier signal to obtain a more precise measurement of the total propagation delay. Upon detecting the carrier signal zero crossing, a counter stop command is generated at the output of DSP 914 which couples to counter 926 terminating the propagation delay count. DSP 914 then stores the count obtained within a random access memory (not shown). The random access memory is the on-board RAM of the DSP when a small number of measurements are being made. When a large number of measurements are made due to a large number of transmitters within the transmission region, additional RAM, or non-volatile memory such as electrically programmable read only memory (EEPROM) is provided at the regional controller. Once the inter-regional and intra-regional propagation delay measurements have been completed, as described above, the required transmission delays are calculated for each transmitter within the transmission regions. The transmission delay information is then encoded and coupled from the output of DSP 914 to the input of D/A converter 916, which encodes the information for transmission to each transmitter site.

Figure 9:
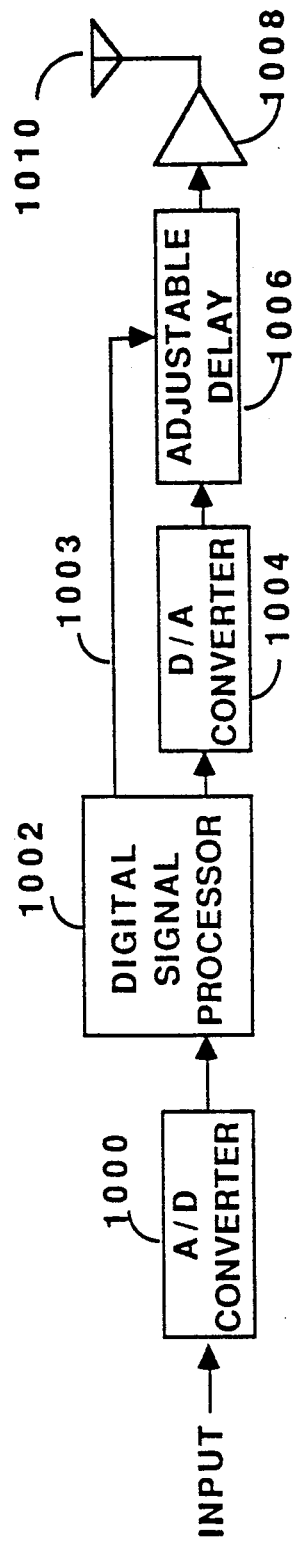
FIG. 9 is an electrical block diagram showing a second embodiment for the implementation of the regional transmitters utilized in the simulcast transmission system of the present invention.

FIG. 9 is an electrical block diagram of a second embodiment of the transmitter utilized in the preferred embodiment of the present invention. The information transmitted from the regional controller is received at the input of A/D converter 1000 which converts the information to a stream of digital information. The stream of digital information couples from the output of A/D converter 1000 to the input of DSP 1002 which processes the information. In normal operation, and during the measurement of inter-regional and intra-regional propagation delay measurements, the stream of digital information couples from the output of DSP 1002 to the input of D/A converter 1004 which converts the information to analog information for transmission. The analog information at the output of D/A converter 1004 couples to the adjustable delay 1006 which delays the information the appropriate amount of time to provide synchronized transmission of the information from all transmitters within the system. The delayed information couples from the output of adjustable delay 1006 to the input of transmitter 1008 which then transmits the information using antenna 1010.

Encoded information to program the transmitter transmission delays is also received at the input of A/D converter 1000 from the regional controller, processed and coupled to the input of DSP 1002. DSP 1002 decodes the received information to determine the current value of the transmission delay required to equalize the transmissions. DSP 1002 programs the adjustable delay 1006 via programming signals provided at the programming output 1003 of DSP 1002.

While specific embodiments of this invention have been shown and described, further modifications and improvements will occur to those skilled in the art. All modifications which retain the basic underlying principles disclosed and claimed herein are within the scope and spirit of the present invention.

I claim:

1. A method for synchronizing message transmissions in a simulcast transmitter system, the system comprising at least two transmission regions, each transmission region having at least one regional receiver coupled to a regional controller for receiving delay measurement signals, each transmission region further having a plurality of regional transmitters having adjustable transmission delays, the regional transmitters being responsive to the regional controllers, for transmitting the messages and the delay measurement signals, the system further comprising a master controller coupled to each regional controller, for enabling the message transmissions, and further for initiating the transmission of delay measurement signals for the measurement of propagation delays, said method comprising the steps of:

generating a first delay measurement signal at the master controller;

transmitting the first delay measurement signal from a selected one of the plurality of regional transmitters operating within a first transmission region;

measuring the propagation delay of the first delay measurement signal with the regional controller controlling the transmissions within the first transmission region;

generating a second delay measurement signal at the master controller;

transmitting the second delay measurement signal from a selected one of the plurality of regional transmitters operating within a transmission region adjacent the first transmission region;

measuring the propagation delay of the second delay measurement signal with the regional controller controlling the transmissions within the first transmission region;

computing a intra-regional differential propagation delay from the propagation delay measurements derived from the transmission of the first and second delay measurement signals;

computing the transmission delays required to equalize the transmissions of each of the plurality of transmitters within the first and second transmission regions in accordance with said step of computing the intra-regional differential propagation delay measurements; and adjusting the transmission delays for each of the regional transmitters operating within the first and second transmission regions.

2. The method for synchronizing message transmissions in a simulcast transmitter system according to claim 1, further comprising the steps of:

initiating an inter-regional measurement control signal at the master controller;

generating a delay measurement signal at the regional controller for each transmission region in response to receiving the measurement control signal by the regional controller;

transmitting the delay measurement signal from each of the plurality of transmitters within each transmission region;

measuring the propagation delay with the regional controller controlling the transmissions for each transmission region;

computing a inter-regional differential propagation delays between each of the plurality of transmitters within each transmission region;

computing the transmission delays required to equalize the transmissions of each of the plurality of transmitters within each transmission region in accordance with said step of computing the inter-regional differential propagation delay measurements; and adjusting the transmission delays for each of the plurality of regional transmitters within each transmission region.

3. The method for synchronizing message transmissions in a simulcast transmitter system according to claim 2, further comprising the steps of:
  computing a maximum inter-regional differential propagation delays for each transmission region;
  computing the additional transmission delays required to equalize the transmissions of each of the plurality of transmitters within each transmission region in accordance with said step of computing the maximum inter-regional differential propagation delay measurements for each transmission region; and
  further adjusting the transmission delays for each of the plurality of regional transmitters within each transmission region.

4. The method for synchronizing message transmissions in a simulcast transmitter system according to claim 2, further comprising the steps of:
  computing a average inter-regional differential propagation delays for each transmission region;
  computing the additional transmission delays required to equalize the transmissions of each of the plurality of transmitters within each transmission region in accordance with said step of computing the average inter-regional differential propagation delay measurements for each transmission region; and
  further adjusting the transmission delays for each of the plurality of regional transmitters within each transmission region.

5. The method for synchronizing message transmissions in a simulcast transmitter system according to claim 2, wherein the delay measurement signals transmitted for the inter-regional propagation delay measurements are transmitted from each of the plurality of regional transmitters in each transmission region in a predetermined sequential order.

6. The method for synchronizing message transmissions in a simulcast transmitter system according to claim 1, further comprising the steps of:
  periodically initiating the measurement of intra-regional transmission propagation delays; and
  further adjusting the transmission delays for each regional transmitter operating within the first and second transmission regions corresponding to the computed intra-regional differential propagation delays between the first and second transmission regions.

7. The method for synchronizing message transmissions in a simulcast transmitter system according to claim 2, further comprising the steps of:
  periodically initiating the measurement of inter-regional transmission propagation delays; and
  adjusting the transmission delays for each of the plurality of regional transmitters within each transmission region corresponding to the periodically computed inter-regional differential propagation delays within each transmission region.

8. The method for synchronizing message transmissions in a simulcast transmitter system according to claim 1, wherein the at least two transmission regions are contiguous to each other.

* * * * *